(12) United States Patent
Yamaura et al.

(10) Patent No.: US 7,519,450 B2
(45) Date of Patent: Apr. 14, 2009

(54) DRIVE METHOD FOR PRODUCTION MACHINE

(75) Inventors: Hiroshi Yamaura, Nagano-ken (JP); Yoshimoto Unno, Nagano-ken (JP)

(73) Assignee: Nissei Plastic Industrial Co Ltd., Nagano (JP)

( * ) Notice: Subject to any disclaimer, the term of this patent is extended or adjusted under 35 U.S.C. 154(b) by 516 days.

(21) Appl. No.: 11/175,328

(22) Filed: Jul. 7, 2005

(65) Prior Publication Data

US 2006/0006565 A1 Jan. 12, 2006

(30) Foreign Application Priority Data

Jul. 9, 2004 (JP) ............................. 2004-203577

(51) Int. Cl.
*B29C 45/00* (2006.01)
(52) U.S. Cl. ...................... 700/200; 700/204; 264/40.1
(58) Field of Classification Search ................. 700/200, 700/204; 264/40.1, 328.1; 425/135, 149, 425/145, 150
See application file for complete search history.

(56) References Cited

U.S. PATENT DOCUMENTS

| 5,610,339 | A  | * | 3/1997 | Haseley et al. ................. 73/660 |
| 6,280,170 | B1 | * | 8/2001 | Furuya et al. ................ 425/150 |
| 6,647,719 | B2 | * | 11/2003 | Truninger ..................... 60/414 |
| 2003/0062643 | A1 | * | 4/2003 | Bulgrin et al. .............. 264/40.1 |

FOREIGN PATENT DOCUMENTS

JP 3455479 B2 7/2003

* cited by examiner

*Primary Examiner*—Albert DeCady
*Assistant Examiner*—Charles R Kasenge
(74) *Attorney, Agent, or Firm*—Birch, Stewart, Kolasch & Birch, LLP

(57) ABSTRACT

An actuator is driven by use of a power drive source, while drive output of the power drive source is switched among a plurality of different drive outputs. Values of a physical quantity regarding an operation state of the actuator and a physical quantity regarding energy consumption corresponding to the operation state are detected. One of the drive outputs is selected on the basis of the detected values and in accordance with a predetermined selection method, and the actuator is driven with the selected drive output.

16 Claims, 3 Drawing Sheets

DRIVE METHOD FOR PRODUCTION MACHINE

BACKGROUND OF THE INVENTION

1. Field of the Invention

The present invention relates to a drive method for a production machine, such as an injection molding machine, which method is preferably used in the case where an actuator provided in the production machine is driven by means of a power drive source.

2. Description of the Related Art

A hydraulic drive apparatus for an injection molding machine disclosed in Japanese Patent No. 3455479 is an example of a conventional drive apparatus which drives a hydraulic actuator provided in an injection molding machine by means of a hydraulic drive source.

The hydraulic drive apparatus disclosed in the patent includes a fixed-displacement hydraulic pump, and a servomotor for driving the hydraulic pump, in which the discharge flow rate and discharge pressure of the hydraulic pump are controlled through control of the rotational speed of the servomotor. Further, a pilot port of a control valve connected to a hydraulic actuator of the molding machine main body is connected to a supply line for working fluid discharged from the hydraulic drive source, via a check valve for preventing reverse flow from the pilot port, and a changeover valve connected in series with the check valve.

Incidentally, the injection molding machine disclosed in the patent includes an injection apparatus and a mold clamping apparatus. In the mold clamping apparatus, a mold clamping cylinder (hydraulic actuator) is driven and controlled by means of the hydraulic drive apparatus so as to clamp a mold. Specifically, in a mold clamping step, high-speed mold closing is performed for a mold in an open state, and then low-speed mold closing is performed when the movable mold half of the mold (movable platen) reaches a low-speed position. Subsequently, high-pressure mold clamping is performed upon closure of the mold. In this case, the drive output for the high-speed mold closing can be set to a ratio (percent ratio) of the rated output (maximum output; 100%) of the hydraulic drive source (hydraulic pump). For example, in ordinary case, a percent ratio of about 90% is typically set. However, when a user wishes to decrease the mold closing speed further, the user can lower the drive output by setting a smaller percent ratio such as 80% or 70%.

However, even when the user lowers the drive output by setting a smaller percent ratio such as 80% or 70%, the actual mold closing speed (mold closing time) achieved by the driven mold clamping cylinder does not drop in proportion to the drive output of the hydraulic drive source, because of influence of, for example, conduit loss (thermal loss) produced within a hydraulic circuit extending from the hydraulic drive source to the mold clamping cylinder. Depending on the configuration and characteristics of the hydraulic circuit, in general, the drop ratio (change ratio) of the mold closing speed (mold closing time) is smaller than that of the drive output of the hydraulic drive source. In other words, even when the drive output of the hydraulic drive source is lowered to a large extent, the mold closing speed (mold closing time) does not drop as much.

FIG. 4 shows the results of an experiment in which in a mold clamping step, motor current I supplied to a servomotor for driving a hydraulic pump of a hydraulic drive source was actually measured with the progress of a molding cycle (molding process). In FIG. 4, Io represents motor current at the time when the drive output was set to 90% output, and Is represents motor current at the time when the drive output was set to 70% output. Further, To represents the mold closing time of a high-speed mold closing section when the drive output was 90% output, and Ts represents the mold closing time of the high-speed mold closing section when the drive output was 70% output. As is apparent from FIG. 4, when the drive output is lowered from 90% output to 70% output, although the motor current I drops greatly, the mold closing time T does not increase as much.

FIG. 5 shows the relation between the motor current I and the closing time T in a comparable manner. When the drive output is lowered from 90% output to 70% output, although the motor current I drops from 4.45 A to 2.65 A, the closing time T increases only slightly, from 0.16 sec to 0.18 sec. That is, although the drop ratio of the motor current I is about 40%, the increase ratio of the mold closing time is about 10%.

As described above, in the case of a hydraulic drive apparatus, in many cases, the actual value of a certain control parameter does not change in proportion to a value set for the control parameter, and may greatly change depending on the configuration and characteristics of the hydraulic circuit and other factors. In addition, a user cannot know this state as clear information. If a user can know the above-described state of high-speed mold closing from accurate information representing the state, the user can compare the state at the time of 90% output and the state at the time of 70% output. Through this comparison, the user may determine that the effect of reducing electricity consumption attained by 70% output outweighs the effect of shortening the closing time attained by 90% output, and accordingly select 70% output. This selection is desirable from the viewpoint of energy saving (the effect of reducing the emission of carbon dioxide). As described above, the conventional hydraulic drive apparatus has not been driven in a proper manner from the viewpoint of energy savings, and there has been room for further improvement.

SUMMARY OF THE INVENTION

An object of the present invention is to provide a drive apparatus for a production machine which enables a user to know accurate information regarding an operation state of the production machine, and to optimally set (select) the magnitude of drive output of a power drive source.

Another object of the present invention is to provide a drive apparatus for a production machine which can improve energy saving performance and in particular, can avoid wasteful energy consumption, which would otherwise occur in a hydraulic system circuit.

In order to achieve the above objects, the present invention provides a drive method for a production machine adapted to drive an actuator of the production machine by use of a power drive source, the method comprising the steps of driving the actuator by use of the power drive source, while switching drive output of the power drive source among a plurality of different drive outputs; detecting values of at least a physical quantity regarding an operation state of the actuator and a physical quantity regarding energy consumption corresponding to the operation state; selecting one of the drive outputs on the basis of the detected values and in accordance with a predetermined selection method; and driving the actuator with the selected drive output.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known parts is omitted.

First, the configuration of an injection molding machine M (production machine Mo), in which a drive method according to the present embodiment can be practiced, will be described with reference to FIG. 3.

Figure 3:
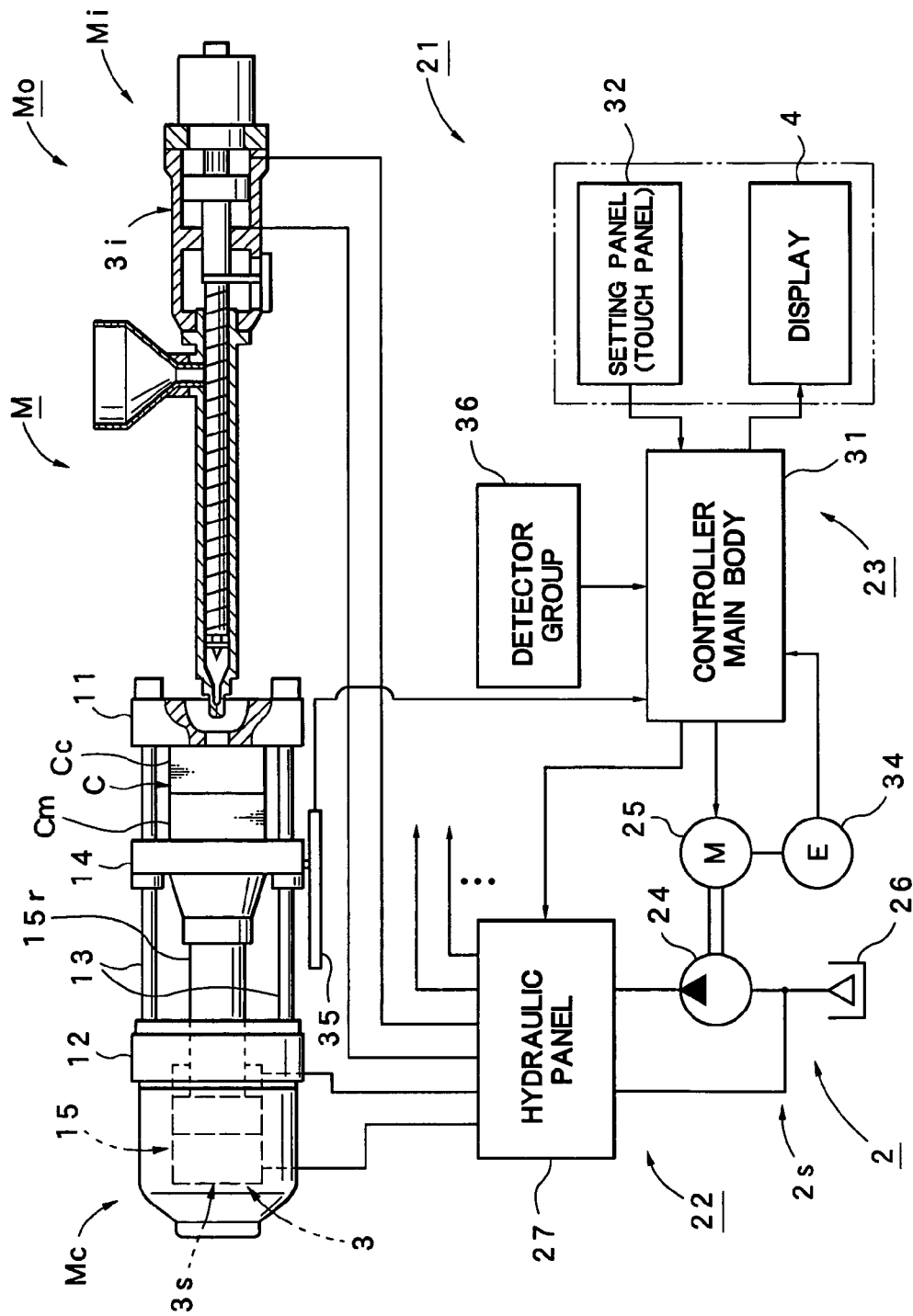
FIG. 3 is a diagram showing the structure of an injection molding machine (production machine) in which the drive method can be practiced.
Figure 4:
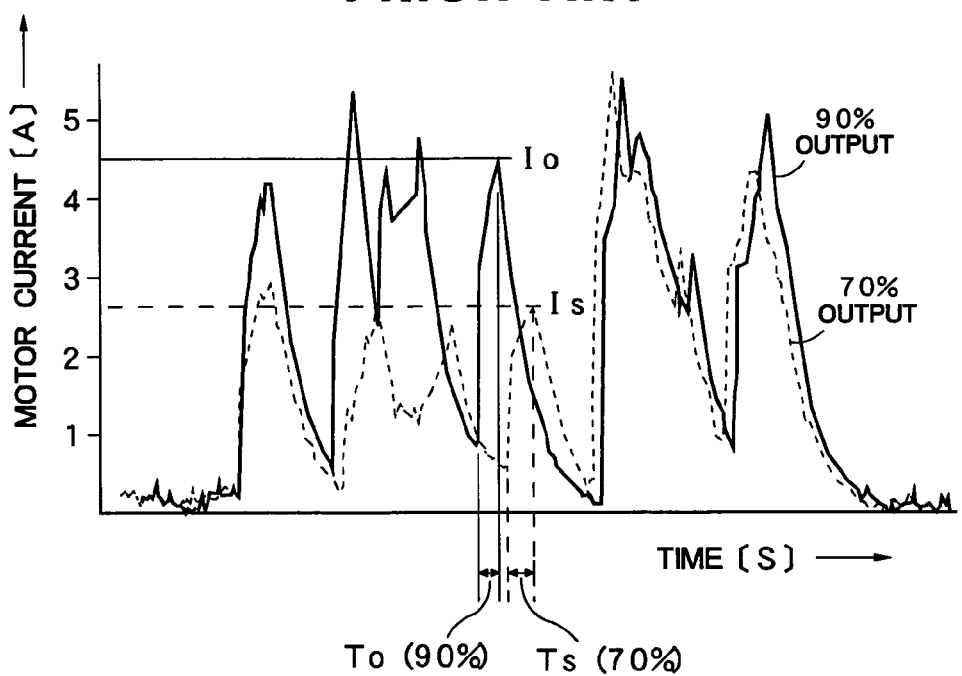
FIG. 4 is a graph showing changes in motor current with time (progress of a molding cycle), the graph being used for describing a conventional technique.
Figure 5:
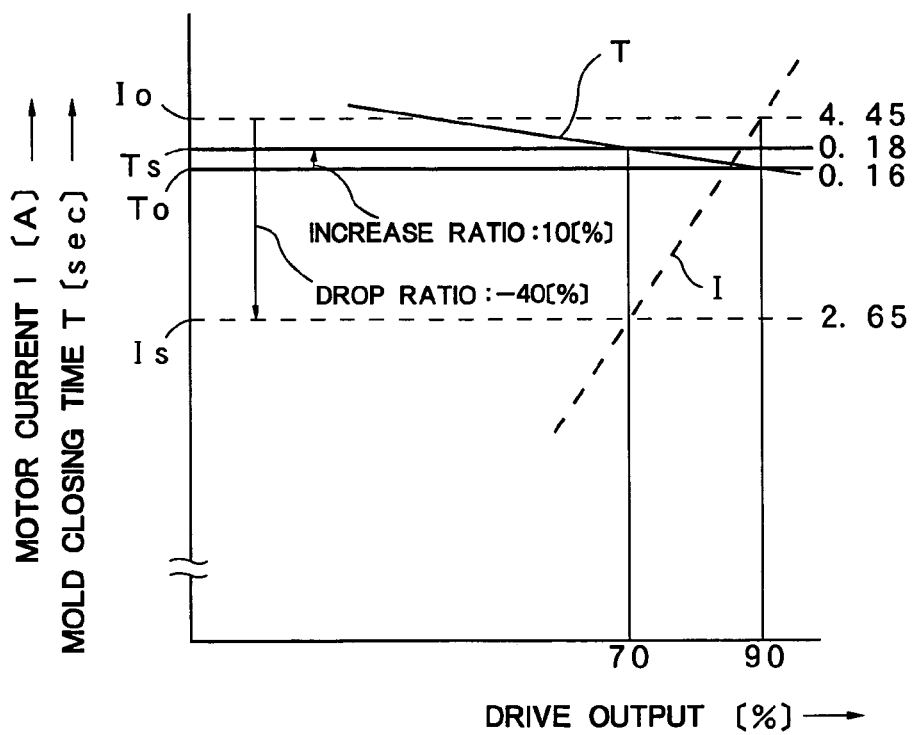
FIG. 5 is a graph showing changes in motor current and mold closing time with drive output, the graph being used for describing the conventional technique.

As shown in FIG. 3, the injection molding machine M includes an injection unit Mi and a mold clamping unit Mc. The mold clamping unit Mc includes a stationary platen 11 and a pressure-receiving platen 12 which are separated from each other and fixed to an unillustrated machine base. Four tie bars 13 extend between the stationary platen 11 and the pressure-receiving platen 12. A movable platen 14 is slidably supported by the tie bars 13. A movable mold half Cm is attached to the movable platen 14, and a stationary mold half Cc is attached to the stationary platen 11. The movable mold half Cm and the stationary mold half Cc constitute a mold C. A mold clamping cylinder 15, which constitutes a hydraulic actuator 3s (actuator 3), is attached to the pressure-receiving platen 12, and a piston rod 15r of a mold clamping piston accommodated in the mold clamping cylinder 15 projects forward and is connected to the back face of the movable platen 14.

Meanwhile, reference numeral 21 denotes a hydraulic drive apparatus, which includes a hydraulic system circuit 22 and a control system circuit (electric system circuit) 23. The hydraulic system circuit 22 includes a hydraulic drive source 2s, which constitutes a power drive source 2. The hydraulic drive source 2s includes a fixed-displacement hydraulic pump 24, and a servomotor (pump motor) 25 for driving the hydraulic pump 24. An intake port of the hydraulic pump 24 is connected to an oil tank 26. A discharge port of the hydraulic pump 24 is connected to an input port of a hydraulic panel 27. The hydraulic panel 27 includes a hydraulic network including various control valves, etc. and its output port is connected to the above-described mold clamping cylinder 15 of the injection molding machine M, an injection cylinder 3i of the injection unit Mi, and other various hydraulic actuators.

Meanwhile, the control system circuit 23 includes a controller main body 31, and a setting panel 32 and a display 4, which are connected to the controller main body 31. The setting panel 32 is formed by a touch panel integrated with the display 4. Further, the servomotor 25 is connected to the controller main body 31. Moreover, a rotary encoder 34, a linear scale 35, and a detector group 36 are connected to the controller main body 31. The rotary encoder 34 is attached to the servomotor 25 so as to detect the number of rotations of the servomotor 25. The linear scale 35 detects the position of the movable platen 14. The detector group 36 includes various sensors, such as a hydraulic sensor (pressure sensor) and a position sensor, for detecting physical quantities regarding the operation states of various portions of the injection molding machine M. In the present embodiment, the controller main body 31 includes a servo circuit and has a function of servo-controlling the servomotor 25 on the basis of encoder pulses output from the rotary encoder 34 to thereby control the discharge flow rate and pressure of the hydraulic pump 24.

Next, a drive method for the injection molding machine M (production machine Mo) according to the present embodiment will be described with reference to FIGS. 1 to 3.

The drive method according to the present embodiment exemplifies the case where high-speed mold closing is performed by means of the mold clamping unit Mc. First, the mold clamping cylinder 15 is driven by the hydraulic drive source 2s, while the drive output of the hydraulic drive source 2s is changed among a plurality of different drive outputs P1, P2, etc. For each drive output, at least a physical quantity regarding the operation state of the mold clamping cylinder 15 (i.e., the mold closing time T1, T2, T3, etc. of the high-speed mold closing) and a physical quantity regarding the energy consumption corresponding to the operation state (i.e., motor current I1, I2, I3, etc. of the servomotor 25 of the hydraulic drive source 2s) are detected. Setting of the different drive outputs P1, P2, etc. or detection of values of the physical quantities are performed under the condition that the mold clamping cylinder 15 operates properly.

In the present embodiment, a detection mode for detecting values of the physical quantities (T1, etc. and I1, etc.) is provided. When necessary, a user selects this detection mode for performing the detection processing. In an alternative method, before the injection molding machine M is shipped from a plant, the detection processing is performed under ordinary conditions in terms of the weight of a mold, etc. so as to prepare and store an output selection screen Vs as shown in FIG. 1 at the time of shipment. The former procedure is advantageous in that when the mold C is changed or at any other occasion, the user can know the precise operation state. The latter procedure is advantageous in that the user is not required to perform the detection processing. In either case, the output selection screen Vs as shown in FIG. 1 is created on the basis of the detection results (detected values), and is displayed on the display 4.

Next, the specific processing steps will be described for the case in which the detection processing is performed upon the user's selection of the detection mode.

In the illustrated example, molding conditions regarding mold closing in a mold clamping step are set in the middle of molding condition setting. In this case, since a mold closing screen Vc shown in FIG. 2 is displayed on the display 4, the user can perform various settings in relation to mold closing by use of this mold closing screen Vc. Notably, the mold closing screen Vc includes various setting sections such as a drive output setting section 41 for high-speed mold closing, a drive output setting section 42 for low-speed mold closing, a low speed changeover position setting section 43, a high-pressure mold clamping position setting section 44, a drive output setting section 45 for low-pressure mold closing, and a drive output setting section 46 for high-pressure mold closing. The mold closing screen Vc also includes various display sections such as an item display section 47, a motor present detected value display section 48, an item present detected value display section 49, a mold present position display section 50, and a mold thickness display section 51.

Here, the drive output for high-speed mold closing is assumed to be set. In this case, the user touches the high-speed mold closing drive output setting section 41 of the mold closing screen Vc shown in FIG. 2. Since the display 4 has a touch panel, the user can select an operation of setting the drive output for high-speed mold closing, by means of touching a corresponding portion of the screen. As a result, the output section screen Vs shown in FIG. 1 is displayed on the mold closing screen Vc in the form of a window. The output section screen Vs includes an actuator display section 61, a step display section 62, and a setting item display section 63, as well as a detection result selection display section 65 and an update key 66. The detection result selection display section 65 includes a selection column 71, in which selection numbers are displayed, a display column 72 for displaying drive outputs of the hydraulic drive source 2s, a display column 73 for displaying detected values of motor current, a display column 74 for displaying motor current reducing ratios (electricity saving ratios), a display column 75 for displaying mold closing times, and a display column 76 for displaying mold closing time change ratios. In these display columns 72 to 76, respective values corresponding to the selection numbers in the selection column 71 are displayed. In the illustrated example, the user can select one of three selection numbers 1, 2, and 3, and set (select) one of three different drive outputs P1, P2, and P3 corresponding to the selection numbers 1, 2, and 3. Accordingly, in the drive output display column 72, 95%, 90%, and 85% are displayed as the drive outputs P1, P2, and P3, respectively. The update key 66 serves as a selection key for selecting the detection mode.

When the user selects the detection mode by touching the update key 66, the detection mode is performed automatically. First, the drive output of the hydraulic drive source 2s is set to 95% the rated output, and the mold closing step is performed automatically from a state in which the mold is opened. At this time, the controller main body 31 detects motor current I1 of the servomotor 25 and displays the motor current I1 in a corresponding row of the motor current detected value display column 73. Further, the controller main body 31 detects mold closing time T1 (time required to pass through a high-speed mold closing section) and displays the mold closing time T1 in a corresponding row of the mold closing time display column 75. In this case, a peak value of the motor current I1 or the average of plurality of sampled values of the motor current I1 may be detected and displayed. Alternatively, an instruction value (target value) previously set for the drive output P1 may be retrieved and displayed. Therefore, the term "detection" used in relation to the present invention encompasses retrieval of such an instruction value (target value). The mold closing time T1 can be detected through detection of position of the movable platen 14 by means of the linear scale 35 and a timer function of the controller main body 31.

Further, upon completion of the mold clamping step of 95% output, the drive output of the hydraulic drive source 2s is set to 90% the rated output, and the mold closing step is again performed automatically from a state in which the mold is opened, whereby motor current I2 and mold closing time T2 are detected. After that, the drive output of the hydraulic drive source 2s is set to 85% the rated output, and the mold closing step is again performed automatically from a state in which the mold is opened, whereby motor current I3 and mold closing time T3 are detected.

Figure 1:
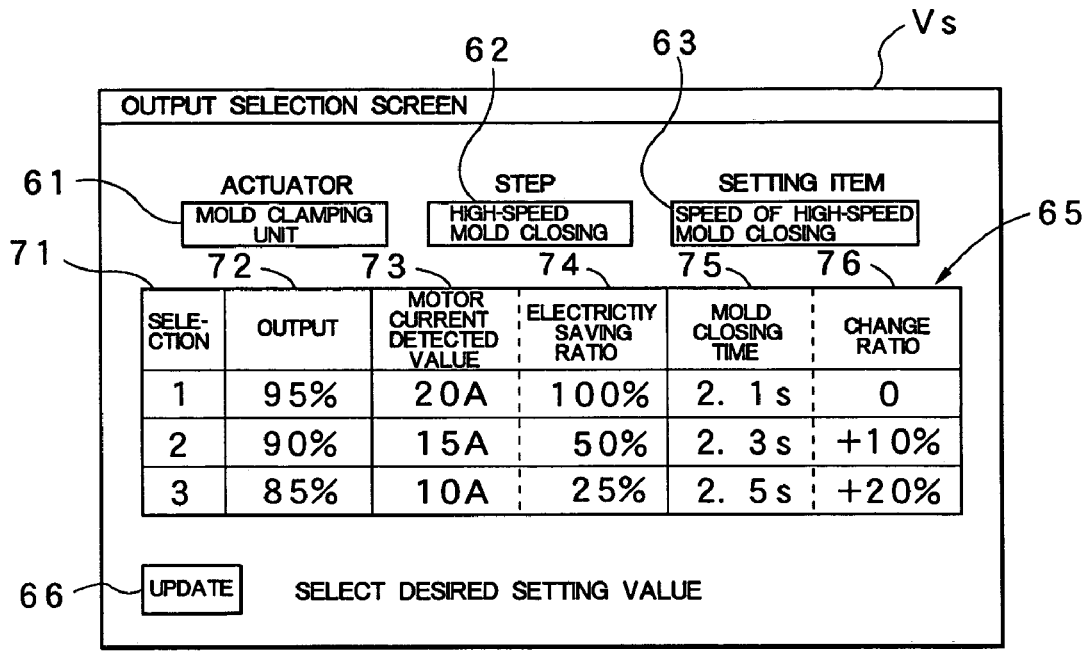
FIG. 1 is a schematic illustration of an output selection screen used in a drive method for a production machine according to an embodiment of the present invention.
Figure 2:
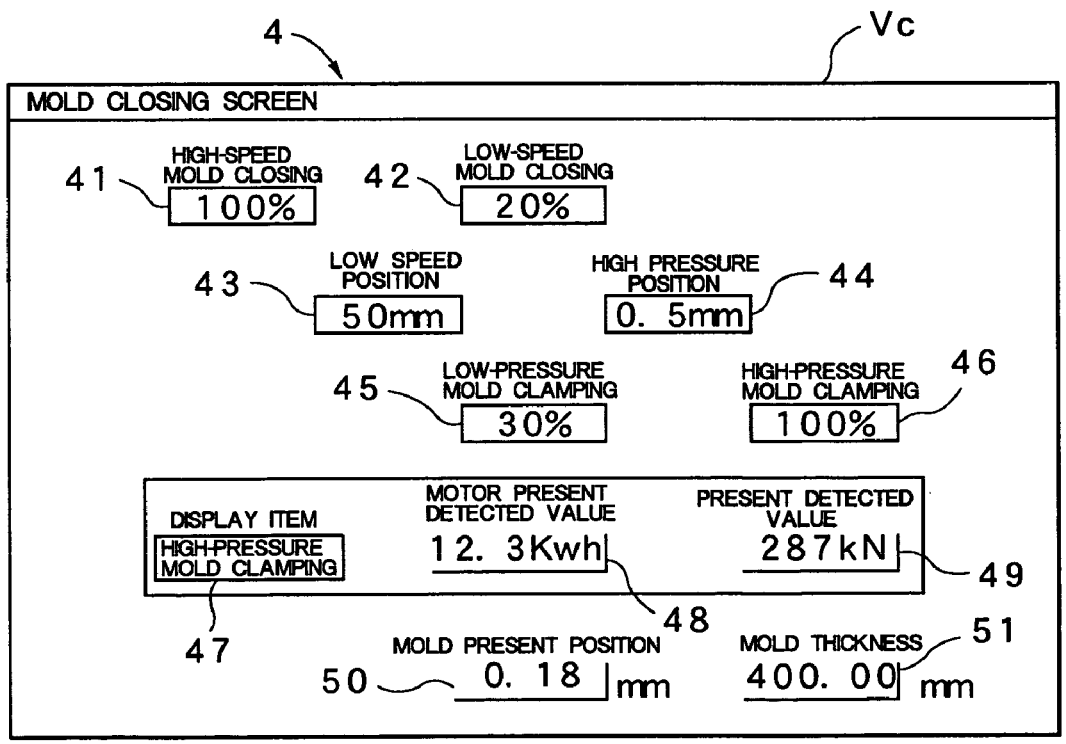
FIG. 2 is a schematic illustration of a mold closing screen used in the drive method.

Upon completion of such detection processing, as shown in FIG. 1, the respective diction results are shown in the detection result selection display section 65 of the output selection screen Vs. In addition, the reducing ratios (electricity saving ratios) of motor currents I2 and I3 and the change ratios of the mold closing times T2 and T3 in relation to the motor current and the closing time in the case of the maximum drive output P1 (I1, T1) are displayed, in terms of percentage, in the electricity saving ratio display column 74 and the mold closing time change ratio display column 76, respectively. Notably, the electricity saving ratios are values representing the corresponding reducing ratios of electrical power converted from the reducing ratios of motor current.

Meanwhile, the user can select (set) one of the drive outputs P1, etc. by use of this output selection screen Vs. For example, in the case where delivery of products is not urgent, and the user considers electricity saving (energy saving) to be more important than production speed, the user may select the selection number 3 so as to select or set the drive output P3. In contrast, in the case where delivery of products is urgent, and the user wishes to complete production as soon as possible, the user may select the selection number 1 so as to select or set the drive output P1. Notably, the above-described selection is performed through touching of one of the selection numbers 1, etc. in the selection column 71. Thus, the selected drive output P1, etc. is displayed in the display window of the high-speed mold closing drive output setting section 41 of the mold closing screen Vc shown in FIG. 2.

As described above, in the drive method for the injection molding machine M according to the present embodiment, the results of detection of mold closing times T1, etc. (physical quantity regarding the operation state of the mold clamping cylinder 15) and motor currents I1, etc. of the servomotor 25 of the hydraulic drive source 2s (physical quantity regarding the energy consumption corresponding to the operation state) are displayed on the output selection screen Vs on the display 4, and the user can arbitrarily set (select) the drive output P1, etc. of the hydraulic drive source 2s by use of the output selection screen Vs. Therefore, the user can accurately know information regarding the operation state and thus can perform optimal setting. In addition, the drive method of the present invention contributes to energy savings. At the time of setting, the detection results are displayed on the display 4 in the form of the output selection screen Vs, and one of the drive outputs P1, P2, etc. is selected by use of the selection column 71. Therefore, the user can select any one of the drive outputs P1, etc. by means of self-judgment. Moreover, wasteful energy consumption, which is likely to result from the operation of opening and closing the mold C by means of the mold clamping unit Mc, can be avoided. Moreover, the hydraulic drive source 2s is used as the power drive source 2, and the mold clamping cylinder 15 (hydraulic actuator 3s) driven by the hydraulic drive source 2s is used as the actuator 3. Therefore, wasteful energy consumption, which is likely to occur in the hydraulic system circuit, can be avoided.

While the present invention has been described with reference to the preferred embodiment, the present invention is not limited thereto. Regarding the details of the method and the structure, quantities, among others, modifications and any omission or addition may be possible as needed without departing from the scope of the invention.

In the above-described embodiment, the drive method of the present invention is applied to the high-speed mold closing in the mold clamping step of the injection molding machine M. However, the drive method of the present invention can be applied to other steps. The injection molding machine M is shown an example of the production machine Mo. However, the present invention can be applied to various other production machines, including not only molding machines of other types, but also press machines and NC machine tools. In the above-described embodiment, the hydraulic drive source 2s and the hydraulic actuator 3s are shown as examples of the power drive source 2 and the actuator 3. However, the drive method of the present invention can be applied to other types of mechanical and electrical power drive sources and actuators. Mold closing times T1, etc. are exemplified as a physical quantity regarding the operation state of the actuator 3, and motor currents I1, etc. are exemplified as a physical quantity regarding energy consumption. However, other physical quantities may be used. The above-described embodiment exemplifies a selection method in which detection results are displayed on the selection screen Vs, and one of drive outputs P1, etc. is selected by use of the selection screen Vs. However, one of drive outputs P1, etc. may be selected automatically on the basis of the detection results and a previously set predetermined selection condition. In this case, for example, the automatic selection is performed in such a manner that when the user selects a previously set power saving mode, the drive output P1, etc. which can save the most energy is selected automatically.

What is claimed is:

1. A drive method for a production machine adapted to drive an actuator of the production machine by use of a power drive source, the method comprising the steps of:
    driving the actuator by use of the power drive source, while switching drive output of the power drive source among a plurality of different drive outputs;
    detecting values of at least a physical quantity regarding an operation state of the actuator and a physical quantity regarding energy consumption corresponding to the operation state;
    selecting one of the drive outputs on the basis of the detected values and in accordance with a predetermined selection method; and
    driving the actuator with the selected drive output; and
    wherein the power drive source is a hydraulic drive source, and the actuator is a hydraulic actuator driven by the hydraulic drive source,
    wherein the step of detecting values of the physical quantities includes performing detection processing in response to selection of a detection mode,
    wherein the detection mode is selected by use of an output selection screen displayed on a display, and
    wherein at least an electricity saving ratio with respect to electricity consumption at the time of the maximum drive output is displayed on the output selection screen.

2. A drive method for a production machine according to claim 1, wherein the actuator is driven under the condition that it operates properly.

3. A drive method for a production machine according to claim 1, wherein the step of detecting values of the physical quantities includes retrieving values of the physical quantities which are previously set through performance of detection processing under standard conditions before shipment of the production machine from a plant.

4. A drive method for a production machine according to claim 1, wherein the predetermined selection method includes displaying the detected values on a display by use of a selection screen, and selecting one of the drive outputs by use of the selection screen.

5. A drive method for a production machine according to claim 1, wherein the predetermined selection method includes automatically selecting one of the drive outputs on the basis of the detected values and a previously set predetermined selection condition.

6. A drive method for a production machine according to claim 1, wherein the physical quantity regarding the operation state is time.

7. A drive method for a production machine according to claim 1, wherein the physical quantity regarding energy consumption is motor current.

8. A drive method for a production machine according to claim 1, wherein the production machine is an injection molding machine.

9. A drive method for a production machine adapted to drive an actuator of the production machine by use of a power drive source, the method comprising the steps of:
    driving the actuator by use of the power drive source, while switching drive output of the power drive source among a plurality of different drive outputs;
    detecting values of at least a physical quantity regarding an operation state of the actuator and a physical quantity regarding energy consumption corresponding to the operation state;
    selecting one of the drive outputs on the basis of the detected values and in accordance with a predetermined selection method; and
    driving the actuator with the selected drive output;
    wherein the step of detecting values of the physical quantities includes performing detection processing in response to selection of a detection mode selected by use of an output selection screen displayed on a display; and
    wherein at least an electricity saving ratio with respect to electricity consumption at the time of the maximum drive output is displayed on the output selection screen.

10. A drive method for a production machine according to claim 9, wherein the actuator is driven under the condition that it operates properly.

11. A drive method for a production machine according to claim 9, wherein the step of detecting values of the physical quantities includes retrieving values of the physical quantities which are previously set through performance of detection processing under standard conditions before shipment of the production machine from a plant.

12. A drive method for a production machine according to claim 9, wherein the predetermined selection method includes displaying the detected values on a display by use of a selection screen, and selecting one of the drive outputs by use of the selection screen.

13. A drive method for a production machine according to claim 9, wherein the predetermined selection method includes automatically selecting one of the drive outputs on the basis of the detected values and a previously set predetermined selection condition.

14. A drive method for a production machine according to claim 9, wherein the physical quantity regarding the operation state is time.

15. A drive method for a production machine according to claim 9, wherein the physical quantity regarding energy consumption is motor current.

16. A drive method for a production machine according to claim 9, wherein the production machine is an injection molding machine.

* * * * *